US012637144B2

(12) United States Patent
Wada

(10) Patent No.: US 12,637,144 B2
(45) Date of Patent: May 26, 2026

(54) DRIVER ASSISTANCE DEVICE, DRIVER ASSISTANCE METHOD, AND STORAGE MEDIUM

(71) Applicant: TOYOTA JIDOSHA KABUSHIKI KAISHA, Toyota (JP)

(72) Inventor: Mitsuo Wada, Ebina (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 100 days.

(21) Appl. No.: 18/491,924

(22) Filed: Oct. 23, 2023

(65) Prior Publication Data

US 2024/0208571 A1 Jun. 27, 2024

(30) Foreign Application Priority Data

Dec. 21, 2022 (JP) ................................. 2022-204357

(51) Int. Cl.
B62D 15/02 (2006.01)
B62D 6/08 (2006.01)
G08G 1/16 (2006.01)

(52) U.S. Cl.
CPC ........... B62D 15/0265 (2013.01); B62D 6/08 (2013.01); G08G 1/16 (2013.01)

(58) Field of Classification Search
CPC ......... B62D 15/0265; B62D 6/08; G08G 1/16
USPC ........................................................ 701/41
See application file for complete search history.

(56) References Cited

U.S. PATENT DOCUMENTS

| | | | |
|---|---|---|---|
| 7,692,534 B2 | 4/2010 | Kataoka et al. | |
| 8,352,124 B2 | 1/2013 | Taguchi | |
| 8,682,500 B2 | 3/2014 | Sakugawa | |
| 8,818,634 B2 | 8/2014 | Fujita et al. | |
| 9,168,953 B2 | 10/2015 | Mitsumoto et al. | |
| 9,714,034 B2 | 7/2017 | Otake et al. | |
| 9,880,558 B2 | 1/2018 | Nakamura | |
| 9,902,399 B2 | 2/2018 | Torii et al. | |
| 10,345,443 B2 | 7/2019 | Masui et al. | |
| 10,611,240 B2 | 4/2020 | Masui et al. | |
| 2017/0001642 A1* | 1/2017 | Kumai | B60W 30/16 |
| 2017/0122749 A1* | 5/2017 | Urano | G01S 19/42 |
| 2017/0248954 A1 | 8/2017 | Tomatsu et al. | |
| 2019/0039614 A1 | 2/2019 | Nagata et al. | |
| 2023/0339493 A1* | 10/2023 | Nagasawa | B60W 40/09 |

FOREIGN PATENT DOCUMENTS

| | | |
|---|---|---|
| JP | 2017-013614 A | 1/2017 |
| JP | 2017-151782 A | 8/2017 |
| JP | 2019-028951 A | 2/2019 |

* cited by examiner

*Primary Examiner* — Scott A Reinbold
(74) *Attorney, Agent, or Firm* — SoraIP, Inc.

(57) ABSTRACT

The driver assistance device according to the present disclosure performs avoidance steering control for controlling the steering mechanism of the host vehicle so that the host vehicle avoids the target when the target object exists in front of the host vehicle. When the occupant inputs a steering torque equal to or higher than a threshold value to the steering mechanism during execution of the avoidance steering control, the driver assistance device cancels the avoidance steering control. Then, in accordance with the frequency of cancellation of the avoidance steering control, the driver assistance device changes the avoidance amount by the avoidance steering control.

5 Claims, 3 Drawing Sheets

FIG. 1
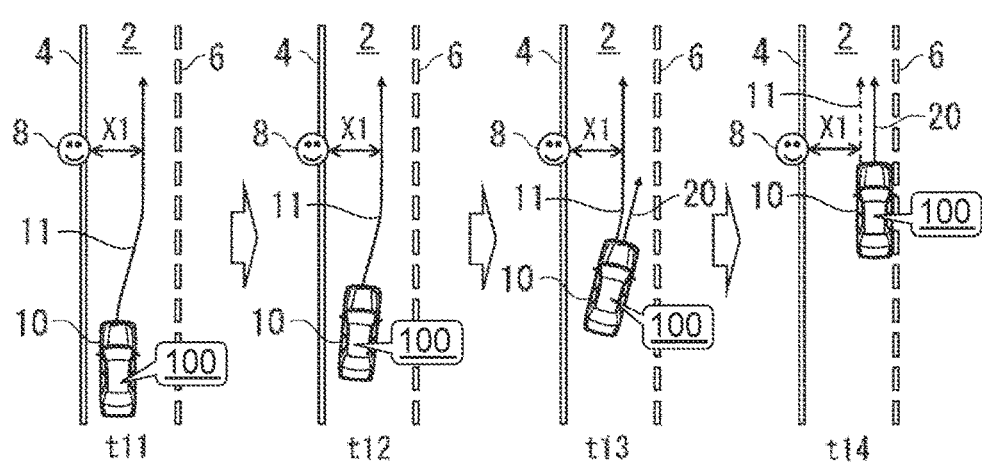
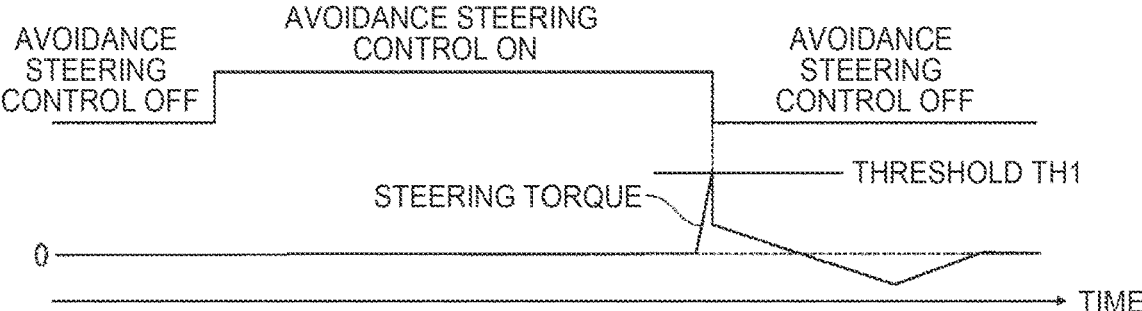
FIG. 2
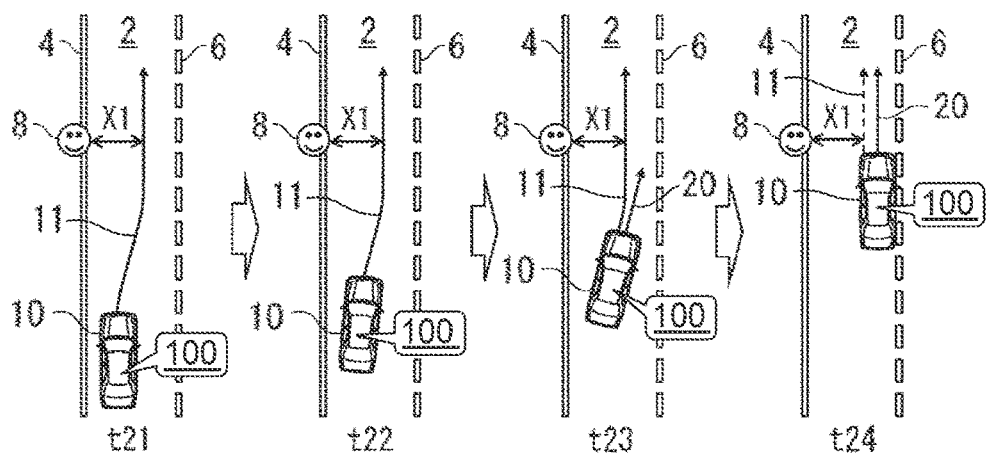
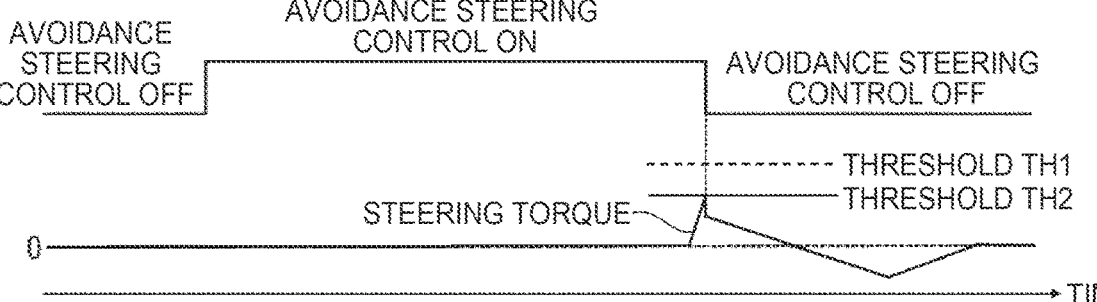

DRIVER ASSISTANCE DEVICE, DRIVER ASSISTANCE METHOD, AND STORAGE MEDIUM

CROSS-REFERENCE TO RELATED APPLICATION

This application claims priority to Japanese Patent Application No. 2022-204357 filed on Dec. 21, 2022, incorporated herein by reference in its entirety.

BACKGROUND

1. Technical Field

The present disclosure relates to a device, a method, and a storage medium for assisting in driving of a vehicle.

2. Description of Related Art

Japanese Unexamined Patent Application Publication No. 2019-028951 (JP 2019-028951 A) discloses a vehicle control device that proactively avoids collisions with pedestrians ahead of a vehicle. When there is a pedestrian in a predetermined assistance area ahead of the vehicle, the vehicle control device performs avoidance steering control to distance the vehicle from the pedestrian.

When a driver steers the vehicle so as to avoid a pedestrian, the distance from the pedestrian at which the driver feels safe varies from one driver to another. Even when the avoidance steering control is automatically performed by system of the vehicle, the driver will become anxious in a situation in which the distance from the pedestrian at the time of avoidance is closer than the distance expected by the driver.

SUMMARY

The present disclosure has been made in view of the above issues. One object of the present disclosure is to enable an avoidance amount by avoidance steering control to be an avoidance amount that matches the senses of an occupant, when assisting the occupant in driving by the avoidance steering control.

The present disclosure provides a device for achieving the above object. A device according to the present disclosure is a driver assistance device for assisting in driving of a vehicle. The device according to the present disclosure includes at least one processor, and at least one memory that is communicatively coupled to the at least one processor, and in which a plurality of instructions is stored. The instructions are configured to cause the at least one processor to execute the following first through third processing. The first processing is to perform avoidance steering control to control a steering mechanism of the vehicle when a target object is present ahead of the vehicle, such that the vehicle avoids the target object. The second processing is to cancel the avoidance steering control when an occupant inputs steering torque no less than a threshold value to the steering mechanism during executing of the avoidance steering control. The third processing is to change an avoidance amount by the avoidance steering control in accordance with frequency of cancellation of the avoidance steering control.

The present disclosure also provides a storage medium for achieving the above object. In the storage medium according to the present disclosure, the program is a program that causes a computer to assist in driving of a vehicle, and is configured to cause the computer to execute the above-described first to third processing. The program according to the present disclosure also is a program that can be stored in a computer-readable storage medium.

Further, the present disclosure provides a method for achieving the above object. The method according to the present disclosure is a driver assistance method for assisting in driving of a vehicle by a computer. The method according to the present disclosure includes the following first to third steps. The first step is a step of performing avoidance steering control to control a steering mechanism of the vehicle when a target object is present ahead of the vehicle, such that the vehicle avoids the target object. The second step is a step of cancelling the avoidance steering control when an occupant inputs steering torque no less than a threshold value to the steering mechanism during executing of the avoidance steering control. The third step is a step of changing an avoidance amount by the avoidance steering control in accordance with frequency of cancellation of the avoidance steering control.

When the occupant inputs the steering torque to the steering mechanism during execution of the avoidance steering control and the avoidance steering control is frequently cancelled, it is estimated that this is because the avoidance amount by the avoidance steering control does not match the senses of the driver. According to the device, the method, and the storage medium according to the present disclosure, the avoidance amount by the avoidance steering control is changed in accordance with the frequency of cancellation of the avoidance steering control, and accordingly the avoidance amount by the avoidance steering control can be brought nearer to an avoidance amount matching the senses of the occupant.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 1 is a diagram for explaining an outline of driving support control according to an embodiment of the present disclosure;

FIG. 2 is a diagram for explaining an outline of driving support control according to an embodiment of the present disclosure;

FIG. 4 is a flowchart illustrating a procedure of driving support control according to an embodiment of the present disclosure.

DETAILED DESCRIPTION OF EMBODIMENTS

1. Overview of Driving Assistance Control

Figure 3:
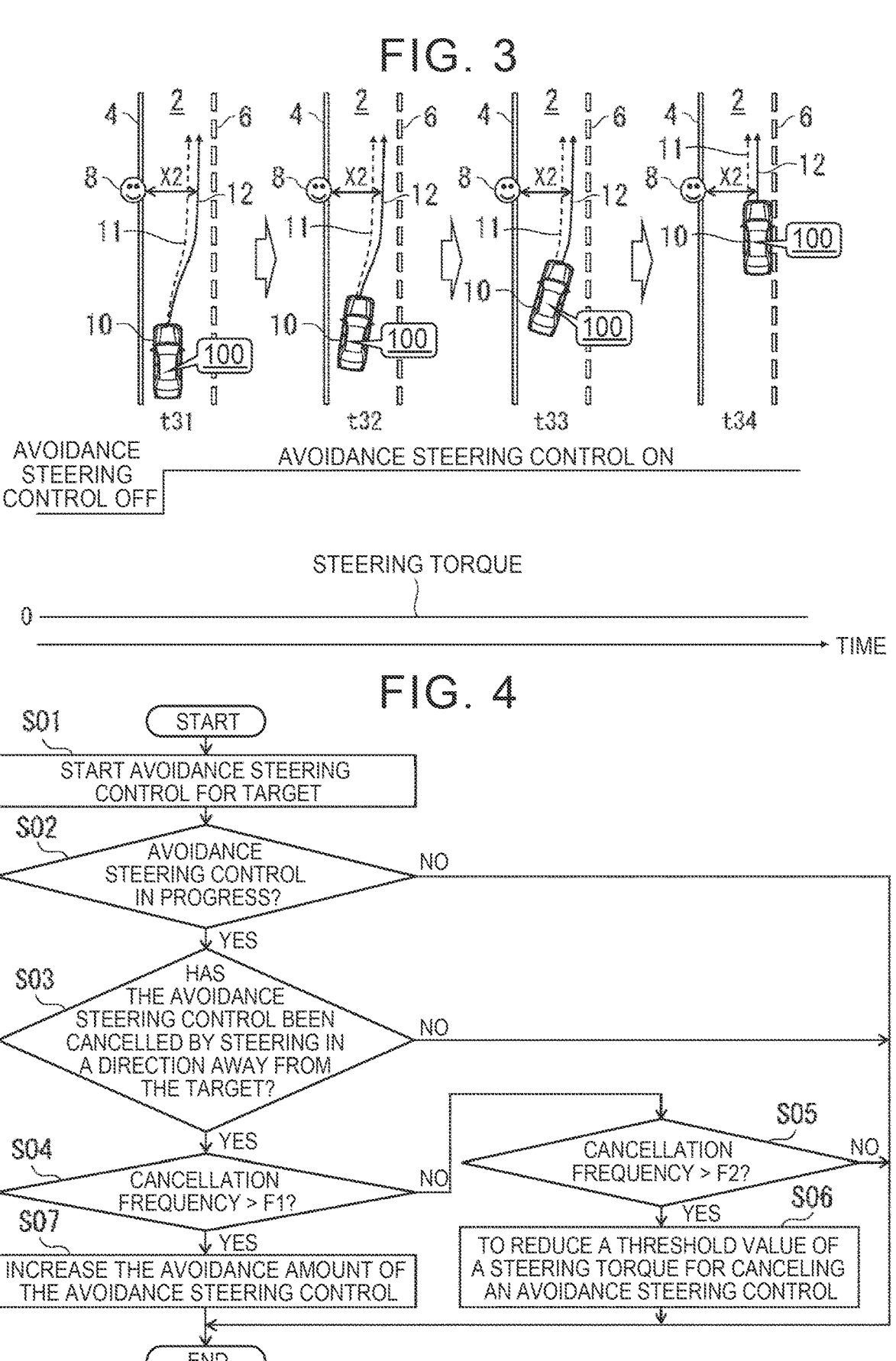
FIG. 3 is a diagram for explaining an outline of driving support control according to an embodiment of the present disclosure.

FIG. 1 to FIG. 3 are conceptual diagrams for explaining driving support control according to an embodiment of the present disclosure. The driving assistance control is a vehicle control performed by the driver assistance device 100 mounted on the vehicle 10. The vehicle control is a vehicle control for avoiding a collision between the vehicle 10 and a front object. The vehicle 10 may be an autonomous vehicle capable of leaving at least the steering control among the steering control, the acceleration control, and the deceleration control to the driver assistance device 100. Hereinafter, the vehicle 10 on which the driver assistance device 100 is mounted is referred to as a host vehicle, and an outline of the driving assistance control will be described mainly with respect to the relationship between the host vehicle 10 and its surrounding objects.

FIG. 1 illustrates a state in which the host vehicle 10 is traveling in the traveling lane 2 defined by the two dividing lines 4 and 6. Four scenes differing in the position and attitude of the host vehicle 10 in the traveling lane 2 are scenes in the time t11, t12, t13, t14 in order from the left, and are arranged in the order of the time flow. That is, FIG. 1 shows changes in the position and attitude of the host vehicle 10 in the order of time t11, t12, t13, t14.

In the example illustrated in FIG. 1, the road on which the host vehicle 10 travels is a road on the left side. The left dividing line 4 is a road side band, and the right division line 6 is a lane boundary line. A pedestrian 8 is present in the vicinity of the dividing line 4 in front of the host vehicle 10. Even if the pedestrian 8 is moving while standing still, the possibility of the pedestrian 8 suddenly jumping out into the traveling lane 2 is not zero. Therefore, the pedestrian 8 is a risk of causing a collision for the host vehicle 10. In a case where such a target that may be a risk is recognized, avoidance steering control for controlling the steering mechanism of the host vehicle 10 so as to avoid the target is performed as the driving support control by the driver assistance device 100. Hereinafter, a target to be subjected to the avoidance steering control is referred to as an object target.

In the middle stage of FIG. 1, transitions between the on state and the off state of the avoidance steering control are represented by time charts. In the embodiment illustrated in FIG. 1, the avoidance steering control is started at the time t11. With the start of the avoidance steering control, the target trajectory 11 offset to the side of the division line 6 is generated so as to avoid the pedestrian 8 as the target object. The avoidance amount for the pedestrian 8 by the avoidance steering control, that is, the lateral distance X1 from the pedestrian 8 to the target trajectory 11 is defined as, for example, a function of the vehicle speed of the host vehicle 10. Like the position and attitude of the host vehicle 10 in the time t12, the driver assistance device 100 controls the steering mechanisms so as to cause the host vehicle 10 to travel along the target trajectory 11.

However, the lateral distance felt by the occupant, particularly the driver, is different for each driver. Therefore, when the host vehicle 10 travels along the target trajectory 11, there is not necessarily a driver who is anxious about the movement of the host vehicle 10 with respect to the pedestrian 8. In order to enable such a driver to perform a steering operation by himself/herself, the driver assistance device 100 is provided with a function of canceling the avoidance steering control in response to a request from the driver.

In the lower part of FIG. 1, the transition of the steering torque input by the driver to the steering mechanism of the host vehicle 10 is represented by a time chart. In the avoidance steering control, the driver assistance device 100 automatically controls the steering mechanism. Therefore, the driver does not need to operate the steering mechanism. Therefore, if the driver entrusts the steering control to the driver assistance device 100, the steering torque is not generated. However, when the driver attempts to intervene in the steering control, a steering torque for moving the steering mechanism controlled by the driver assistance device 100 is generated. For example, in the time t13, when the driver wants to steer the host vehicle 10 toward the trajectory 20 outside the target trajectory 11, the driver attempts to turn the steering wheel clockwise, and a rightward steering torque is generated.

When the steering torque increases and reaches the threshold TH1, the driver assistance device 100 cancels the avoidance steering control and returns from the automatic steering control to the manual steering control by the driver. After the steering torque reaches the threshold TH1 due to the manual return of the steering control, the host vehicle 10 is steered by the steering torque inputted to the steering mechanism by the driver. Consequently, the host vehicle 10 can travel along the trajectory 20 that is farther from the pedestrian 8 than the target trajectory 11, such as the position and attitude of the host vehicle 10 in the time t14. As described above, the driver can obtain a sense of security when passing the side of the pedestrian 8 by making the lateral distance with respect to the pedestrian 8 larger than the lateral distance X1 by the driver assistance device 100.

The function that can cancel the avoidance steering control included in the driver assistance device 100 can provide the driver with a sense of security that the movement of the host vehicle 10 when avoiding the target does not suit his/her own sense. However, when the avoidance steering control must be cancelled frequently, the driver remembers troublesomeness. Further, it is considered that the cancellation of the avoidance steering control which is frequently performed is caused by a deviation between the setting of the avoidance steering control and the feeling of the driver. Therefore, when the avoidance steering control is frequently cancelled, the driver assistance device 100 changes the settings of the avoidance steering control described below.

In the avoidance steering control, at least two parameters are subject to change of settings. The first parameter is a threshold value of the steering torque at which the avoidance steering control is cancelled. The second parameter is the avoidance amount for the target, i.e., the lateral distance from the target to the target trajectory. The effect of changing the threshold value will be described with reference to FIG. 2, and the effect of changing the avoidance amount will be described with reference to FIG. 3.

FIG. 2 shows changes in the position and attitude of the host vehicle 10 after the avoidance steering control is turned on in the order of time t21, t22, t23, t24 when only the setting of the thresholds is changed with respect to the example shown in FIG. 1. In the example illustrated in FIG. 2, the lateral distance from the pedestrian 8 to the target trajectory 11 by the avoidance steering control is the same lateral distance X1 as in the example illustrated in FIG. 1. Therefore, the driver's anxiety about the movement of the host vehicle 10 with respect to the pedestrian 8 is the same as that in the example shown in FIG. 1. For this reason, in the time t23, the driver intervenes in the steering control so as to steer the host vehicle 10 toward the trajectory 20 that is further outward than the target trajectory 11.

The driver's intervention in the steering control increases the steering torque. However, in the example illustrated in FIG. 2, the threshold TH2 of the steering torque for which the avoidance steering control is cancelled is changed to a value lower than the threshold TH1 set in the example illustrated in FIG. 1. When the threshold value is lowered, the reaction force received from the steering wheel when the driver intervenes in the steering control is lowered. As a result, the driver can easily switch to manual steering when he/she feels anxious about the movement of the host vehicle 10 by the avoidance steering control.

Note that, when the avoidance steering control is being executed, a certain amount of steering torque is generated even if the driver attaches his or her hand to the steering wheel. In order to prevent the avoidance steering control from being cancelled by the steering torque such as the noise, a lower limit value is set in advance at a threshold value of the steering torque at which the avoidance steering control is cancelled. The above-described threshold TH2 can be arbitrarily set as long as it does not fall below the lower limit. On condition that the threshold value does not fall below the lower limit value, the threshold value can be changed stepwise according to the frequency at which the avoidance steering control is cancelled.

FIG. 3 shows, in order of time t31, t32, t33, t34, changes in the position and attitude of the host vehicle 10 after the avoidance steering control is turned on when only the avoidance amount setting is changed with respect to the example shown in FIG. 1. In the example illustrated in FIG. 3, the target trajectory 12 is generated so as to avoid the pedestrian 8, which is the target, as the avoidance steering control starts. The target trajectory 12 is offset further toward the division line 6 than the target trajectory 11 in the example shown in FIG. 1. Therefore, the lateral distance X2 from the pedestrian 8 to the target trajectory 11 by the avoidance steering control is larger than the lateral distance X1 shown in FIG. 1.

By increasing the lateral distance, the driver's anxiety about the movement of the host vehicle 10 with respect to the pedestrian 8 is reduced or eliminated. As a result, in the example shown in FIG. 3, after the start of the avoidance steering control, there is no intervention in the steering control by the driver, and at least no steering torque is generated such that the avoidance steering control is cancelled. Here, the host vehicle 10 travels along the target trajectory 12 and passes through a position separated from the pedestrian 8 by a lateral distance X2. This means that the lateral distance X2 from the changed pedestrian 8 matches the feeling of the driver.

If the avoidance steering control continues to be cancelled after changing the lateral distance from the pedestrian 8 to the lateral distance X2, this means that there is still a deviation from the driver's feeling. In this case, the lateral distance from the pedestrian 8 is further enlarged from the lateral distance X2 in accordance with the frequency of cancellation. However, the lateral distance that can be set in the avoidance steering control has an upper limit value. The upper limit value is set under the restriction that the host vehicle 10 does not protrude to the oncoming lane. On condition that the lateral distance does not exceed the upper limit value, the lateral distance can be changed stepwise according to the frequency of cancellation of the avoidance steering control.

2. Procedure of Driving Support Control

The driver assistance device 100 performs driving support control in accordance with the procedure illustrated in FIG. 4. FIG. 4 is a flowchart showing a procedure of driving support control performed by the driver assistance device 100 in the present embodiment, and is also a flowchart showing a driver assistance method according to the embodiment of the present disclosure. This flowchart is executed when the presence of the target object is recognized in front of the host vehicle.

In S01 of the flow chart shown in FIG. 4, the avoidance steering control for the target object is started. At the start of the avoidance steering control, a target trajectory for avoiding the target object is generated based on the currently set avoidance amount (lateral distance to the target object). In S02 to be executed next, it is determined whether or not the avoidance steering control is being executed, that is, whether or not the avoidance steering control has ended. If the avoidance steering control has ended, this procedure ends.

If it is determined in S02 that the avoidance steering control is being executed, the process proceeds to S03. In S03, it is determined whether or not the avoidance steering control is cancelled by the driver's intervention in the steering control. Here, the intervention in the steering control is an intervention by steering in a direction in which the subject vehicle is moved away from the target. Although the avoidance steering control is cancelled by the steering in the direction in which the subject vehicle approaches the target object, such steering is not included in the intervention in the steering control described here. If there is no cancellation of the avoidance steering control due to an intervention in the steering control, the procedure ends.

If it is determined in S03 that the avoidance steering control has been cancelled due to an intervention in the steering control, the process proceeds to S04. In S04, it is determined whether or not the cancellation frequency of the avoidance steering control is greater than the reference value F1. The cancellation frequency can be defined as, for example, a ratio of the number of cancellations to the cumulative number of operations of the avoidance steering control. As a specific example, when the avoidance steering control is activated 100 times in the accumulation so far, the avoidance steering control is cancelled during the operation of the present avoidance steering control, and the number of cancellations becomes 50 times in the accumulation, the cancellation frequency is $50/100$, that is, 0.5.

In the calculation of the cancellation frequency, the lower limit number of samples is set to the cumulative number of operations of the avoidance steering control. If the cumulative number of operations is equal to or greater than the minimum number of samples, the cancellation frequency calculated from the cumulative number of operations is treated as an effective value. However, if the cumulative number of operations is less than the minimum number of samples, the cancellation frequency calculated from the cumulative number of operations is treated as an invalid value due to insufficient accuracy due to insufficient samples.

As a reference value of the cancellation frequency, two reference value F1, F2 of differing magnitudes are set in advance. As will be described later, the reference value F2 is a reference value for setting thresholds of steering torques. The reference value F1, F2 can be arbitrarily set, but the reference value F1 is larger than the reference value F2. For example, the reference value F1 may be set to 0.5, and the reference value F2 may be set to 0.3. Therefore, the cancellation frequency of the avoidance steering control first exceeds the reference value F2 and then exceeds the reference value F1. Therefore, when the cancellation frequency does not exceed the reference value F2, the cancellation frequency is always equal to or less than the reference value F1, and the determination result of S04 is negative.

If S04 determination is negative, the process proceeds to S05. In S05, it is determined whether or not the cancellation frequency of the avoidance steering control is greater than the reference value F2. When the cancellation frequency is equal to or less than the reference value F2, it can be determined that the avoidance steering control by the driver is not frequently cancelled. That is, the driver can determine that he/she does not remember any particular anxiety with respect to the movement of the host vehicle by the avoidance steering control. In this case, since it is not necessary to change the setting of the avoidance steering control, this procedure ends. In addition, in a case where the calculated cancel frequency is treated as an invalid value due to insufficient cumulative number of operations of the avoidance steering control, the present procedure is terminated.

If S05 determines that the cancellation frequency is greater than the reference value F2, the process proceeds to S06. In S06, the thresholds of the steering torques for canceling the avoidance steering control are lowered. By lowering the threshold of the steering torque, the driver can easily switch to manual steering, and the stress felt by the driver at the time of switching to manual steering can be reduced.

If S04 determines that the cancellation frequency is greater than the reference value F1, the process proceeds to S07. In S07, the avoidance quantity of the avoidance steering control is increased. By increasing the avoidance amount of the avoidance steering control, it is possible to bring the avoidance amount close to the avoidance amount that matches the sense of the driver, and it is possible to eliminate or reduce the driver's anxiety when avoiding the target object.

By performing the driving assistance control in the above-described procedure, it is possible to bring the two parameters set in the avoidance steering control closer to a value suitable for the sense of the driver. Note that the reference value F1 and the reference value F2 of the cancellation frequency may be the same value, or a value larger than the reference value F1 may be set as the reference value F2.

When the avoidance amount of the avoidance steering control is increased, the frequency of cancellation of the avoidance steering control decreases. Since the feeling of the driver also changes depending on the familiarity, the avoidance amount may be slightly lowered after a predetermined period of time has elapsed since the avoidance amount was increased. As a result, if the frequency of cancellation of the avoidance steering control increases again, the avoidance amount may be returned to the original value, and if it does not increase, the avoidance amount may be further reduced.

3. Configuration of Driver Assistance Device

Figure 5:
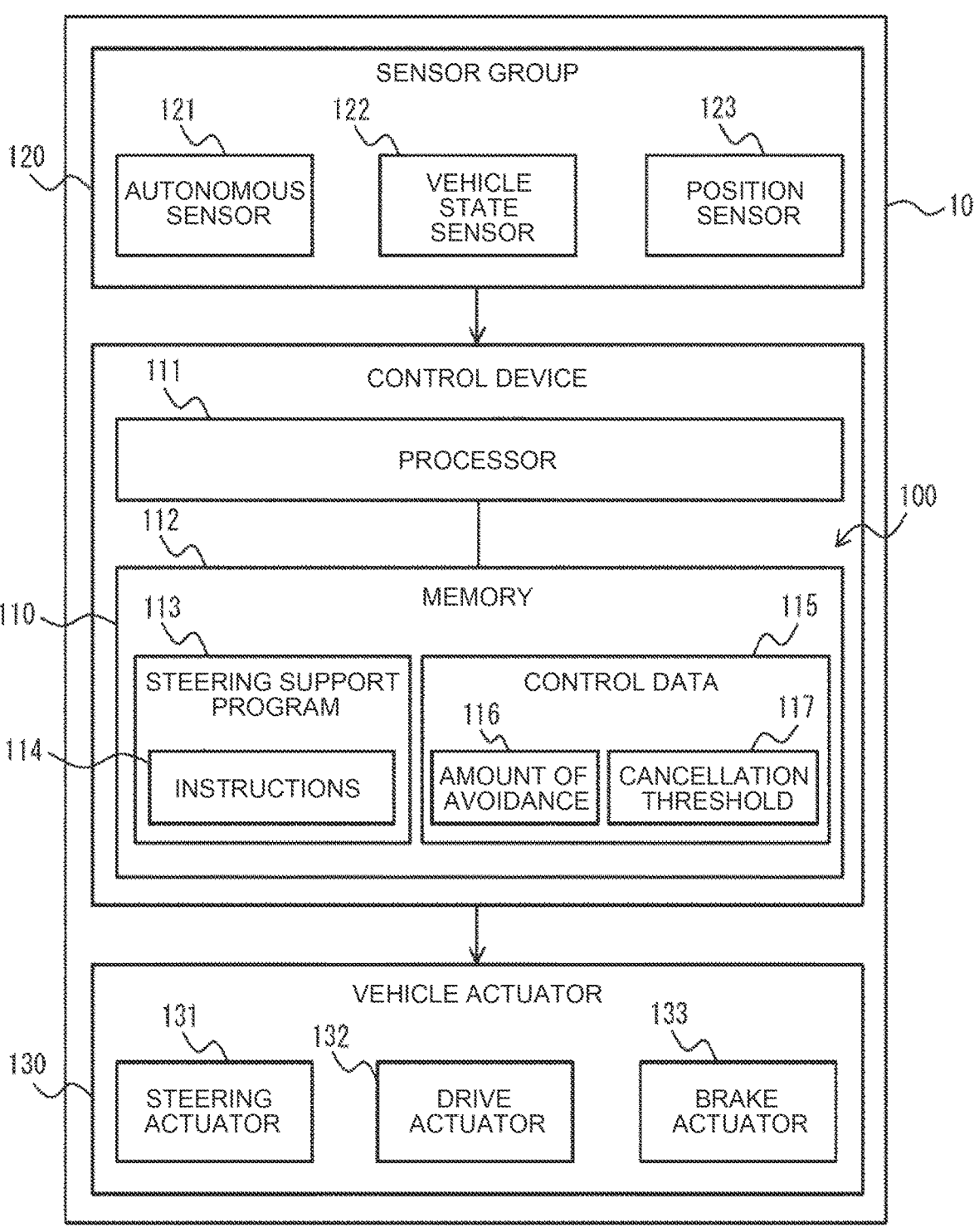
FIG. 5 is a block diagram illustrating a configuration of a driver assistance device according to an embodiment of the present disclosure.

Finally, a configuration of the driver assistance device 100 for executing the above-described driving support control will be described. FIG. 5 is a diagram illustrating a configuration example of the driver assistance device 100 and the vehicle 10 to which the driver assistance device is applied. The vehicle 10 includes a control device 110 that controls the vehicle 10, a sensor group 120 that inputs information to the control device 110, and a vehicle actuator 130 that operates according to a signal output from the control device 110. The control device 110, the sensor group 120, and the vehicle actuator 130 are connected by an in-vehicle network. The driver assistance device 100 includes at least a control device 110. However, the driver assistance device 100 may include the sensor group 120 in addition to the control device 110. Further, the driver assistance device 100 may further include a vehicle actuator 130.

The sensor group 120 includes an autonomous sensor 121, a vehicle state sensor 122, and a position sensor 123. The autonomous sensor 121 is a sensor that acquires information on a surrounding situation of the vehicle 10 including a region in front of the vehicle 10. The autonomous sensor 121 includes at least one of a camera, a millimeter-wave radar, and a LiDAR. Based on the information obtained by the autonomous sensor 121, processes such as detection of an object existing around the vehicle 10, measurement of a relative position and a relative speed of the detected object with respect to the vehicle 10, and recognition of a shape of the detected object are performed. A target object present in front of the vehicle 10 is detected by an autonomous sensor 121.

The vehicle state sensor 122 is a sensor that acquires information related to the motion of the vehicle 10. The vehicle state sensor 122 includes, for example, at least one of a wheel speed sensor, an acceleration sensor, a yaw rate sensor, and a steering angle sensor. The position sensor 123 is used to acquire information about the current position of the vehicle 10. As the position sensor 123, a GPS receiver is exemplified. When the driver assistance device 100 has high-precision map information, an obstacle existing in the vicinity of the vehicle 10 can be recognized based on the current position of the vehicle 10 acquired by the position sensor 123 and the high-precision map information.

The vehicle actuator 130 is an actuator that controls the movement of the vehicle 10. The vehicle actuator 130 includes a steering actuator 131 that steers the vehicle 10, a drive actuator 132 that drives the vehicle 10, and a braking actuator 133 that brakes the vehicle 10. The steering mechanism constitutes at least a part of the steering actuator 131.

The control device 110 is an in-vehicle computer represented by Electronic Control Unit (ECU). The control device 110 includes at least one processor 111 and at least one memory 112 communicatively coupled to the processor 111. The processor 111 may be, for example, a Central Processing Unit (CPU), Field-Programmable Gate Array (FPGA), Application-Specific Integrated Circuit (ASIC), or another process unit. The processor 111 may also be a CPU, FPGA, ASIC or a combination of two or more other process units.

The memory 112 stores a driving assistance program 113 including a plurality of executable instructions 114. The driving assistance program 113 is a program for causing the processor 111 to execute the driving assistance control illustrated in a flowchart in FIG. 4. The driving assistance program 113 can be recorded in a computer-readable recording medium (storage medium). The memory 112 stores control data 115 for driving support control. The control data 115 includes an avoidance amount 116 by avoidance steering control and a threshold value (cancellation threshold value) 117 of steering torque at which avoidance steering control is cancelled.

What is claimed is:

1. A driver assistance device for assisting in driving of a vehicle, the driver assistance device comprising:
   a processor; and
   a memory that is communicatively coupled to the processor, in which a plurality of instructions is stored, wherein
   the instructions cause the processor to:
       execute avoidance steering control to control a steering wheel of the vehicle in a case where a target object is present ahead of the vehicle, such that the vehicle avoids the target object,
       generate a target trajectory along which the vehicle is steered to avoid the target object,
       determine whether steering torque input to the steering wheel by an occupant of the vehicle is less than a threshold value,
       execute cancellation of the avoidance steering control in a case where determination is made that the steering torque input to the steering wheel by the occupant is not less than the threshold value during executing of the avoidance steering control, calculate frequency of cancellation of the avoidance steering control, increase an avoidance amount of the avoidance steering control in a case where the calculated frequency of cancellation of the avoidance steering control is greater than a first reference value, and reduce the threshold value in a case where the calculated frequency of cancellation of the avoidance steering control is greater than a second reference value, the second reference value being smaller than the first reference value.

2. A driver assistance method for assisting in driving of a vehicle by a computer, the driver assistance method comprising:

performing avoidance steering control to control a steering wheel of the vehicle in a case where a target object is present ahead of the vehicle, such that the vehicle avoids the target object;

generating a target trajectory along which the vehicle is steered to avoid the target object;

determining whether steering torque input to the steering wheel by an occupant of the vehicle is less than a threshold value;

cancelling the avoidance steering control in a case where determination is made that the steering torque input to the steering wheel by the occupant is not less than the threshold value during executing of the avoidance steering control;

calculating frequency of cancellation of the avoidance steering control;

increasing an avoidance amount of the avoidance steering control in a case where the calculated frequency of cancellation of the avoidance steering control is greater than a first reference value; and reducing the threshold value in a case where the calculated frequency of cancellation of the avoidance steering control is greater than a second reference value, the second reference value being smaller than the first reference value.

3. A non-transitory storage medium storing a program for causing a computer to assist in driving of a vehicle, wherein the program is configured to cause the computer to:

execute avoidance steering control to control a steering wheel of the vehicle in a case where a target object is present ahead of the vehicle, such that the vehicle avoids the target object, generate a target trajectory along which the vehicle is steered to avoid the target object, determine whether steering torque input to the steering wheel by an occupant of the vehicle is less than a threshold value, execute cancellation of the avoidance steering control in a case where determination is made that the steering torque input to the steering wheel by the occupant is not less than the threshold value during executing of the avoidance steering control, calculate frequency of cancellation of the avoidance steering control, increase an avoidance amount of the avoidance steering control in a case where the calculated frequency of cancellation of the avoidance steering control is greater than a first reference value, and reduce the threshold value in a case where the calculated frequency of cancellation of the avoidance steering control is greater than a second reference value, the second reference value being smaller than the first reference value.

4. The driver assistance device according to claim 1, wherein the avoidance amount indicates a distance, in a direction perpendicular to a driving direction of the vehicle, from the target object to the target trajectory generated by the avoidance steering control.

5. The driver assistance device according to claim 1, wherein the frequency of cancellation of the avoidance steering control indicates a ratio between a total number of times the avoidance steering control is canceled and a total number of times the avoidance steering control has been executed.

* * * * *